United States Patent
Wixson

[11] 3,808,397
[45] Apr. 30, 1974

[54] TUNGSTEN INERT GAS WELDING CONTROL UNIT WITH A FILLER METAL FEEDING MEANS

[75] Inventor: Mahlon S. Wixson, Napa, Calif.

[73] Assignee: The United States of America as represented by the Secretary of the Navy, Washington, D.C.

[22] Filed: Dec. 29, 1971

[21] Appl. No.: 213,505

Related U.S. Application Data

[63] Continuation-in-part of Ser. No. 91,736, Nov. 23, 1970, abandoned.

[52] U.S. Cl.............. 219/131 R, 219/74, 219/75, 219/130
[51] Int. Cl............................................. B23n 9/10
[58] Field of Search....... 219/131, 135, 74, 75, 136, 219/130, 138–144, 132

[56] References Cited
UNITED STATES PATENTS

| | | | |
|---|---|---|---|
| 3,581,051 | 5/1971 | Brown............................... | 219/132 |
| 3,609,291 | 9/1971 | Pilia.................................... | 219/132 |
| 3,692,974 | 9/1972 | Thompson et al.................. | 219/132 |
| 2,484,421 | 10/1949 | Moore................................. | 219/132 |
| 3,204,080 | 9/1965 | Spencer.............................. | 219/130 |
| 3,391,333 | 7/1968 | Steinert et al..................... | 219/131 R |
| 3,567,902 | 3/1971 | Stearns.............................. | 219/131 R |
| 2,378,707 | 6/1945 | Hiller................................. | 219/140 |
| 3,477,005 | 11/1969 | Weems............................... | 219/132 |
| 3,319,042 | 5/1967 | Thostrup et al. .................. | 219/130 |
| 2,935,312 | 5/1960 | Kilpatrick et al.................. | 219/74 |
| 3,521,023 | 7/1970 | Dahlman et al. .................. | 219/130 |
| 3,118,051 | 1/1964 | Dixon................................. | 219/131 |

Primary Examiner—J. V. Truhe
Assistant Examiner—George A. Montanye
Attorney, Agent, or Firm—R. S. Sciascia; Charles D. B. Curry

[57] ABSTRACT

A welding control device for controlling the voltage, current and gas flow rate for a gas tungsten arc welder type welding unit. A motor driven rheostat current decay control is provided to prevent abrupt weld cut-off. The remote console unit comprises a current pre-set means, a gas control, a voltmeter and ammeter to maintain the voltage and current as well as a filler metal feeding means. The metal filler means is located on and attached to the forward portion of the two button decay control switch.

3 Claims, 4 Drawing Figures

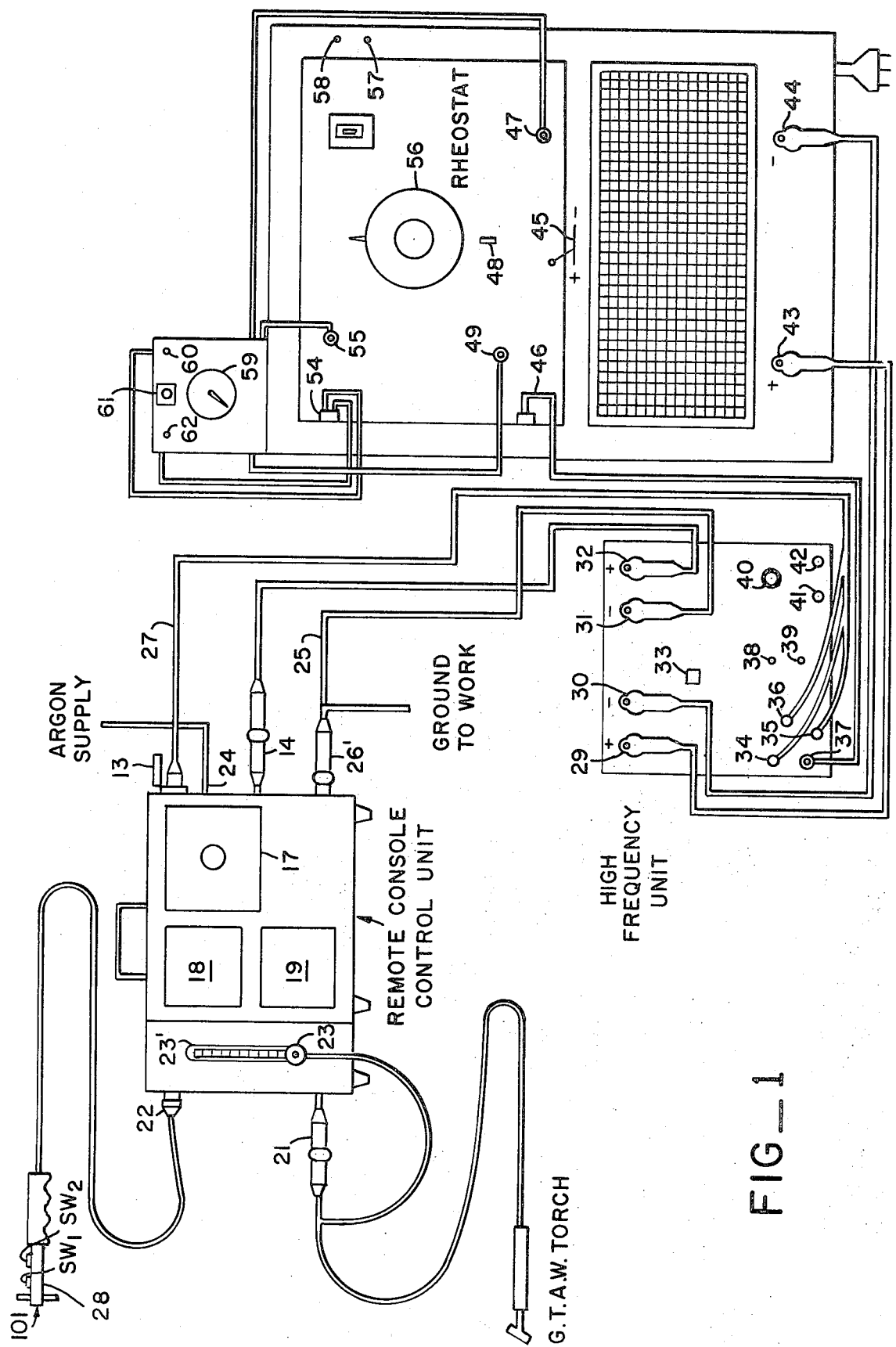
FIG_1

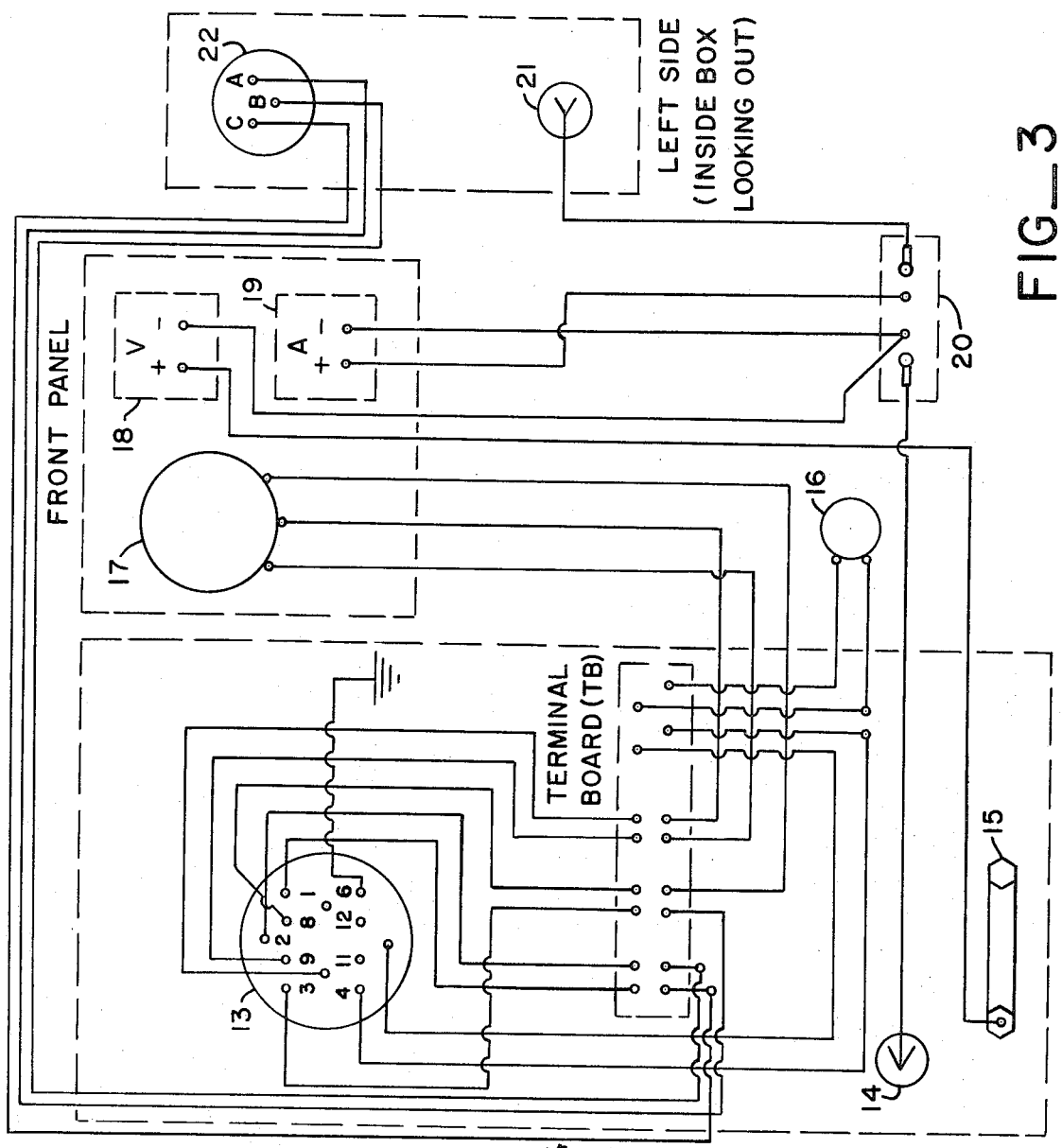
FIG_3
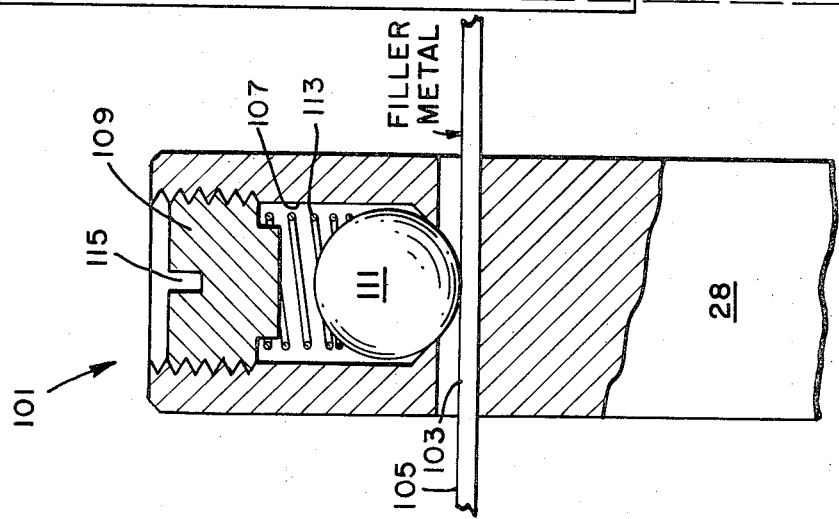
FIG_2

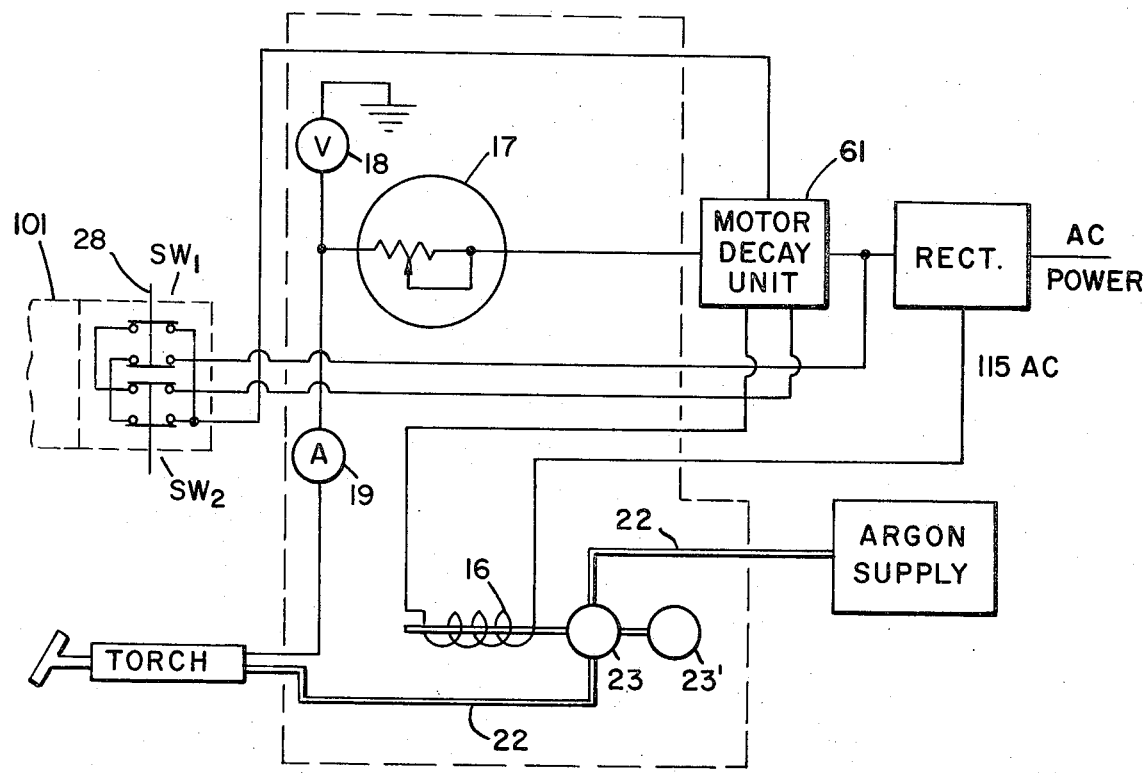
FIG_4

TUNGSTEN INERT GAS WELDING CONTROL UNIT WITH A FILLER METAL FEEDING MEANS

This patent application is continuation-in-part of application by Mahlon S. Wixson filed Nov. 23, 1970 (Navy Case No. 50,459), Ser. No. 91,736 now abandoned.

The invention described herein may be manufactured and used by or for the Government of the United States of America for governmental purposes without the payment of any royalties thereon or therefor.

BACKGROUND OF THE INVENTION

1. Field of the Invention

Industry is beginning to convert from "shielded metal arc welding" to Gas Tungsten Arc Welding, hereafter referred to as GTAW, for various technological reasons. One of the requirements of GTAW is that of close control monitoring and control. The control and monitoring unit of the present invention fills this need. The device also reduces the number of equipment operators required.

2. Description of the Prior Art

The tungsten inert gas welding control unit provides a means to set and monitor the critical welding parameters of current and torch gas flow. The previous methods required that a remote current control box, a meter box and a flowmeter for the torch gas be placed near the job site. Moreover, the system required a helper to accurately set the welding current and torch gas flow and feed the filler metal. The disclosed invention eliminates the aforementioned problems.

SUMMARY OF THE INVENTION

Briefly, the present invention comprises a welding control device for controlling the voltage, current and gas flow rate for a gas tungsten arc welder (GTAW) type welding unit. A motor driven rheostat current decay control is provided to prevent abrupt weld cut-off. The unit has a unique mechanical design and electrical switching mode. The unit is highly portable and can be placed in operation or removed from a job site by one welder with a minimum of effort. The unique device further includes a filler metal feeding device which is located at one end of the two button control switch. The two button control switch controls the arc initiation and current increase decay.

STATEMENT OF THE OBJECTS OF THE INVENTION

A primary object of this invention is to provide a means to set and monitor the critical welding parameters of current and torch gas flow.

A more particular object of this invention is to provide a current decay control to prevent abrupt weld cut-off.

Another object of the present invention is to provide a decay control with a filler metal feeding means so that only one welder is required to operate the welding unit.

Other objects and features will be apparent from the following description of the invention and from the accompanying drawings of the preferred embodiment of the present inventive method wherein:

BRIEF DESCRIPTION OF THE DRAWINGS

FIG. 1 is a drawing of the overall welding system including control console;

FIG. 2 is a drawing of the filler metal feeding device located on the end of two button decay control switch illustrated in FIG. 1;

FIG. 3 is a drawing of the wiring diagram of the control console illustrated in FIG. 1;

FIG. 4 is a diagrammatic view showing the principle components of the control console in relation with the overall welding system illustrated in FIG. 1.

DESCRIPTION OF THE PREFERRED EMBODIMENTS

Referring first to FIG. 1, the remote console control unit generally comprises a cable receptacle 13, gas input connection 24, receptacle 14 for the negative input welding lead, receptacle 25 for the positive input welding lead, receptacle 26 for the positive out welding lead. The welding amperage control rheostat 17, voltmeter 18 and ammeter 19 are illustrated in FIG. 3. FIG. 4 shows receptacle 22 for the decay handswitch control, receptacle 21 for the negative output welding lead, gas outlet connection 23, and gas flowmeter 23'.

Referring now to the drawings, FIG. 1 and FIG. 4 show the unique remote console unit which is operatively connected to the rectifier and high frequency through motor driven decay unit 61. The remote console unit is comprised of an amperage control rheostat 17, a gas valve 23 with a flow valve 23' which is connected to solenoid 16, a voltmeter 18 and an ammeter 19. GTAW torch is connected to gas valve 23 through gas line 22. The gas valve 23 is connected to solenoid 16 which is subsequently controlled by decay unit 61; a handswitch control unit is connected to decay unit 61. The decay unit 61 is a standard Miller device with upper and lower limit switches. The upper limit of decay unit 61 is established by the preset value of resistance set on rheostat 17. Switch 28 is a two-button switch including SW1 and SW2 so that when SW1 is depressed the circuit is completed, thus driving motor driven decay unit to the upper limit which was preset on rheostat 17. When SW2 is depressed and driven down to zero or shut off, the circuit is deactivated, thus opening solenoid 16 and shutting off gas flow through gas valve 23. Switch 28 can be driven up or down or in the intermediate position to vary the current within the preset range set on rheostat 17. 115V AC power is supplied to gas solenoid 16. Voltmeter 18 and ammeter 19 are included in the unique remote console unit to directly monitor the voltage and at the job site.

Referring to FIG. 2, the handswitch control 28' performs a dual purpose: first, to control the current flow; second, to feed the filler metal. The handswitch control includes a filler metal feeding device 101. The feeding device 101 comprises a filler metal slot 103 for feeding filler metal 105. A bored aperature 107 is threaded to accept adjustable spring plunger unit 109. The spring plunger unit 109 includes a steel tension ball 111, tension spring 113 and a headless slotted set screw 115. When the proper amount of tension is applied by set screw 115, the filler metal 105 can be fed to the work piece by the welder. This allows the welder to activate the torch, control the current and feed the filler metal to the work piece. Moreover, this allows the welder to activate the torch, control the current and feed the filler metal to the work piece without requiring the use of additional workers to help.

Referring to FIG. 1 and 3, receptacle 13 consists of 12 common current terminals connected to various inputs and outputs through common current terminal board (TB) or bus bar. Terminal 1 is connected to terminal A of the decay handswitch control receptacle 22. The handswitch control 28, shown in FIG. 2, initiates the arc and increases and decreases the welding amperage. Terminal 2 connects through terminal board (TB) to terminal B of the decay current control receptacle 13. Terminal 3 also connects through terminal board (TB) to terminal C of the decay current receptacle 22C. Terminals 4 and 5 are connected through terminal board (TB) and supply the 115 volt AC power for the inert gas solenoid 16 which is in common connection with decay switch receptacle and subsequently to handswitch control 28 through terminal board (TB). Terminal 6 is ground to the console unit case. Terminal 8 is connected to the welding amperage control rheostat 17 and is operated to increase the current to the desired fixed level. Terminal 9 is the ground of the amperage control rheostat. Terminal 10 is for decreasing of the level of current to cut-off by the amperage control rheostat. All of the above interconnecting terminals are intermediately connected through common conducer terminal bus bar box (TB) by conducting wires, illustrated in FIG. 1. The positive side of voltmeter 18 is connected to conductor 15; the negative terminal being connected to shunt 20. The positive and negative terminals of ammeter 19 are connected to shunt 20. The negative out-lead from receptacle 21 and the negative in-lead from receptacle 14 are shunted through shunt 20. Referring to FIGS. 1, 3 and 4, two-button decay hand switch 28 is connected through a flexible electrical cable to receptacle 22. The decay hand switch is a standard motor driven rheostat that regulates the welding current. The GTAW torch is connected to negative out-welding lead receptacle 21. The inert gas outlet 23 is also connected to the torch through a connecting cable and is controlled by and in common connection with the decay control unit through terminal board (TB) or bus bar. The external inert argon gas supply is connected at receptacle 24 and flows through flexible tubing to exit at the flow valve 23. The 10 conductor cable 27 is attached at receptacle 13 and connects to terminals 34, 35, 36 of the high frequency unit. Terminal 34 is the remote amperage control; terminal 35 is the 115 VAC power supply to the inert gas solenoid 16 and the terminal 36 is to the current decay control. Negative receptacle 14 and positive in receptacles 25 and 26 are connected to terminals 31 and 32 of the high frequency unit. Cable 26' is a ground to be attached to the work. The high frequency unit is connected to the rectifier, as shown in the drawing, and is a standard system. The high frequency unit may also be a component of the rectifier. A Miller Model HF-15 high frequency unit may be used. Referring to FIG. 1, the high frequency unit comprises terminal 29 for the positive input welding lead, terminal 30 for the negative input lead, terminal 31 for the negative output welding lead and terminal 32 for the positive output welding lead. The leads from terminals 31 and 32 are connected to the console control unit, as described above. Terminal 34 for the remote amperage control, terminal 35 for the 115V AC power supply to the inert gas solenoid 16, terminal 36 for the current decay control are connected to receptacle 13, as shown in FIG. 2. The power supply on/off switch 33, inert gas supply on/off switch 38, start control 39, rate control decrease switch 40, receptacle for argon in supply 41, receptacle for argon out 42 and terminal 37 for 10 conductor cable comprise the remainder of the elements of the high frequency unit. It should be noted that elements 41, 42, or the high frequency unit are not required in the operation of the new control unit as the control unit has an independent argon control system. The welding rectifier shown in FIG. 1 is a conventional Miller 220 volt 3-phase unit. However, any suitable rectifier unit may be used. Referring to FIG. 1, positive lead terminal 43 of the rectifier is connected through a flexible cable to positive input terminal 29 of the high frequency unit. Negative lead terminal 44 is connected through a flexible cable to negative out-lead terminal 30. The remainder of the rectifier unit comprises a conventional polarity switch 45, decay power supply terminal 47, amperage range switch 48, remote contactor control terminal 49, GTA/SMA switch 50, decay control 54, remote amperage control terminal 55, welding increase or decrease rheostat 56, on/off switch 57, start/stop switch 58, current indicator 59, current power switch 60, rheostat control of rate decrease 61, decay only current control switch 62 and receptacle 46 for the 10 conductor combined control cable which is connected to terminal 37 of the high frequency unit. The general description of the high frequency and rectifier units has been presented to show how the units are interconnected to the welding control unit and are not considered to be part of the present invention.

Referring now to FIG. 1, the gas unit flowmeter 23' is attached through an outlet adapter to solenoid valve 16. The flowmeter is a flowmeter line oxiweld type L-23. Rheostat 61 with upper and lower switches is a motor driven Miller PN00-622. The voltmeter and ammeters are standard Miller high frequency filter meters with a range of 0–80V DC and 0–310 Amps DC, respectively, or similar type meters well known in the art.

Referring to FIG. 4, decay control unit 61 plugs into the high frequency and rectifier welding units. The control unit is a motor driven rheostat 61 that regulates the welding current and is controlled by the welder on the job by means of a two-push button decay switch 28. The decay control allows the welder to have the welding torch in position with no current flowing until he initiates the current by depressing the decay switch. By depressing switch SW1 the decay will increase to a preset welding amperage set on rheostat 17 which controls rheostat 61. Depressing switch SW2, the current will decrease to a point of shut-off. The welder can also feed the filler metal while he is controlling the rate of decay. The high frequency unit is connected to the rectifier by means of a 10 conductor cable 27, shown in FIG. 1. Both units are standard equipment used in the field and therefore no detailed explanation of their operation and function of the various controls is deemed necessary. The high frequency unit creates a short time duration high voltage current which is used to initiate the welding arc without touching the electrode to the work. Once the arc is established, this high voltage current terminates and the basic welding current continues. The remote amperage control, the decay switch and the volt/amp meter box are connected to the high frequency unit.

Prior to the development of the new and useful console the bulkiness of the high frequency unit with attached components made it virtually impossible to correctly control the amperage and torch gas at the job site. The improvement includes a unique filler metal feeding device which can also be controlled by a single welder.

Having the console on the job site, with all the necessary control adjustments to set the desired welding parameters, provides for a quick check on adjustment without the use of a helper.

What is claimed is:

1. In a tungsten inert gas welding device including a welding control unit connected through current conducting means for remotely controlling the voltage, current and gas flow supplied to a welding torch, and including a rectifier connected to supply current through a motor driven rheostat to said torch, means for supplying a high frequency current to said torch, and a source of inert shielding gas connected to supply gas to said torch, the improvement in said welding control unit comrpsing:
   a. a rheostat control device operatively connected through said conducting means to said motor driven rheostat to preset and control the desired welding current from a preset current set on said rheostat control to current shut-off;
   b. an ammeter operatively connected to said rheostat control by said conducting means to determine and monitor the correct preset current;
   c. a voltmeter operatively connected to said rheostat control and said ammeter connected through said conducting means to monitor the desired preset voltage in the welding device;
   d. a gas cut-off device operatively connected to said gas supply and said welding torch to control the flow of gas from said supply to said torch
   e. a two-push button decay switch separate from said torch comprising a first current increasing switch and a second current decreasing switch said decay switch being operatively connected by a current conducting cable to said rheostat control wherein depressing said first switch increases the current through said motor driven rheostat to said present welding current set on said rheostat control and depressing said second switch decreases current through said motor driven rheostat to cut off said motor driven rheostat further including means responsive to said current cut off to control gas flow through said gas cut-off device to cut off said gas supply to said torch at current cut-off, said two push button decay switch further comprising a means for feeding a filler metal for welding and including a means for controlling the tension on said filler metal.

2. The device described in claim 1 wherein said means for feeding filler metal comprises in combination:
   a. a slot for said feeding filler metal, said slot having an aperature located in the wall area of said slot; and
   b. a tension adjusting means partially extending into said slot through said aperature to apply tension to said filler metal.

3. The device recited in claim 2 wherein said tension adjusting means comprises:
   a. an adjustable spring plunger unit;
   b. a tension ball partially extending into said slot through said aperature operatively coupled to said plunger; and
   c. a tension spring to apply spring tension to said ball.

* * * * *